United States Patent [19]

Yamagishi et al.

[11] Patent Number: 5,143,983
[45] Date of Patent: Sep. 1, 1992

[54] HEAT RESISTANT POLYAMIDE FILM

[75] Inventors: Naomichi Yamagishi, Abiko; Masashi Hasegawa, Tsuchiura, both of Japan

[73] Assignee: Mitsubishi Kasei Polytec Company, Tokyo, Japan

[21] Appl. No.: 758,511

[22] Filed: Sep. 6, 1991

Related U.S. Application Data

[63] Continuation of Ser. No. 495,157, Mar. 19, 1990, abandoned.

[30] Foreign Application Priority Data

Mar. 22, 1989 [JP] Japan .................................. 1-70125

[51] Int. Cl.$^5$ ...................... B29C 55/12; C08L 77/00
[52] U.S. Cl. .................................. 525/432; 264/235.8
[58] Field of Search ............ 264/235.8, 290.2; 525/432; 528/335, 338, 339, 340, 347

[56] References Cited

U.S. PATENT DOCUMENTS 4,120,928 10/1978 Furukawa et al. ........... 264/290.2 X
4,849,498 7/1989 Roerdink et al. .................... 528/339

FOREIGN PATENT DOCUMENTS 1158807  3/1985  European Pat. Off. .
325030   7/1989  European Pat. Off. .
355315   2/1990  European Pat. Off. .
2348805 11/1977  France .
53-6355  1/1978  Japan .

*Primary Examiner*—Leo B. Tentoni
*Attorney, Agent, or Firm*—Oblon, Spivak, McClelland, Maier & Neustadt

[57] ABSTRACT

A heat resistant polyamide film which is obtained by melt-extruding into a sheet a polyamide composition of a mixture of a preformed polyamide (A) composed of diaminobutane and adipic acid and a semi-aromatic polyamide (B) composed of a polyamide containing an aromatic dicarboxylic acid and an aliphatic diamine in an amount of at least 80% by weight of the polyamide-constituting components, in a weight ratio of (A):(B)=99.9:0.1 to 30:70, quenching the sheet, then biaxially stretching it at least 2.0×2.0 times, followed by heat setting at a temperature of at least 205° C., and which has a heat distortion initiation temperature of at least 130° C.

7 Claims, 1 Drawing Sheet

HEAT RESISTANT POLYAMIDE FILM

This application is a continuation of application Ser. No. 07/495,157, filed on Mar. 19, 1990, now abandoned.

FIELD OF THE INVENTION

The present invention relates to a heat resistant polyamide film. More particularly, the present invention relates to a biaxially stretched polyamide film having a high heat distortion initiation temperature, which is capable of maintaining the shape and properties of the film without deformation even at high temperatures.

BACKGROUND OF THE INVENTION

Polyamide films are widely used as base films for packaging by virtue of the excellent toughness, heat resistance, cold resistance, transparency, printability and chemical resistance. In the use as the base films for packaging, there is an increasing demand in recent years for materials having high heat resistance and excellent dimensional stabilities. For example, in the field of food packaging, the sterilizing method tends to be sophisticated year by year, and as is observed in the retort or high retort foodstuffs, foods are first put in packaging bags and then sterilized at a high temperature for a long period of time. Therefore, the base films are required not to undergo a deformation such as shrinkage or expansion at high temperatures.

The heat resistance of plastics includes the one represented by a heat distortion temperature in a short period of time and the one represented by heat resistance for a long period of time (UL temperature index). In the case of sterilization of the food packaging in the above-mentioned application, the heat distortion temperature in a short period of time is critical.

This heat distortion temperature is measured by a method wherein a material is gradually heated under a predetermined load, whereby the temperature at which the material starts to undergo a distortion is taken as an index for heat resistance. As a standard evaluation method, ASTM D648 or ASTM D1637 may be mentioned. Between the two methods, ASTM D1637 whereby a load for elongation is exerted to the material, is more suitable for the determination of the heat distortion temperature of films. [In order to meet the severe requirements of the market, the present inventors have modified the method of ASTM D1637 to some extent, so that the temperature at which a distortion of ±1% (±2% in ASTM D1637) takes place, is taken as the heat distortion initiation temperature and is used as an index for the evaluation of the heat resistance (the details will be given hereinafter)].

As general methods for improving the heat resistance of plastics, it is known (i) to incorporate inorganic fillers, glass fibers or carbon fibers to a crystalline polymer, (ii) to add copper ions to a polyamide (effective for heat stabilization), (iii) to blend a polymer having high heat resistance, and (iv) to introduce heat resistant functional groups to the main polymer chains. However, by the method (i), it is impossible to obtain a heat resistant film having a smooth surface and good transparency. The method (ii) is effective for the improvement of the heat resistance for a long period of time, but is not so effective for the heat distortion temperature in a short period of time. The present inventors consider that the method (iii) of blending a polymer having high heat resistance and the method (iv) of introducing heat resistant functional groups to the main polymer chains, are effective for presenting polyamide films which are useful as highly heat resistant inexpensive packaging base materials.

It is an object of the present invention to provide inexpensive and highly heat resistant packaging base films. However, there is a general belief that a highly heat resistant polymer is highly crystalline, and it is difficult to biaxially stretch it. In fact, a sheet obtained by quenching a molten resin, has white turbidity, and fine crystals are present in the sheet. Since such fine crystals serve as the starting points for rupture during stretching, it is impossible to obtain a biaxially stretched film continuously or constantly. In order to obtain an inexpensive and highly heat resistant film, it is important to select a polymer having a good cost performance (heat resistance/price), and at the same time, it is important to adopt a method whereby the film can be produced continuously at a high speed by biaxial stretching.

SUMMARY OF THE INVENTION

The present inventors have conducted extensive studies on various polyamides with an aim to develop a highly heat resistant polyamide film which can be biaxially stretched and which has a particularly high heat distortion initiation temperature. As a result, they have found a polyamide film which meets such requirements.

Thus, present invention provides a heat resistant polyamide film which is obtained by melt-extruding into a sheet a polyamide composition comprising a polyamide (A) composed of diaminobutane and adipic acid and a semi-aromatic polyamide (B) composed of a polyamide containing an aromatic dicarboxylic acid and an aliphatic diamine in an amount of at least 80% by weight of the polyamide-constituting components, in a weight ratio of (A):(B)=99.9:0.1 to 30:70, quenching the sheet, then biaxially stretching it at least $2.0 \times 2.0$ times, followed by heat setting at a temperature of at least 205° C., and which has a heat distortion initiation temperature of at least 130° C.

According to the present invention, while a heat resistant highly crystalline polyamide (polyamide (A)) is used, a substantially amorphous sheet product is obtained at the stage of quenching from the melt, which makes the biaxial stretching possible. Then, by the orientation crystallization by the biaxial stretching, followed by heat setting, the high crystallinity inherent to the polyamide resin is developed to attain the high heat resistance. Yet, by the biaxial stretching, a continuous production is possible, and a thin film can be produced at a high speed, whereby an inexpensive heat resistant polyamide film can be obtained at a low production cost.

The heat resistant polyamide film according to the present invention has a heat distortion initiation temperature of at least 130° C., which is substantially higher than that of a usual polyamide film.

BRIEF DESCRIPTION OF THE DRAWINGS

In the accompanying drawing, the Figure is a graph of a thermal deformation curve drawn on the basis of the data collected at the time of determining the heat distortion initiation temperature.

DETAILED DESCRIPTION OF THE PREFERRED EMBODIMENTS

Figure 1:
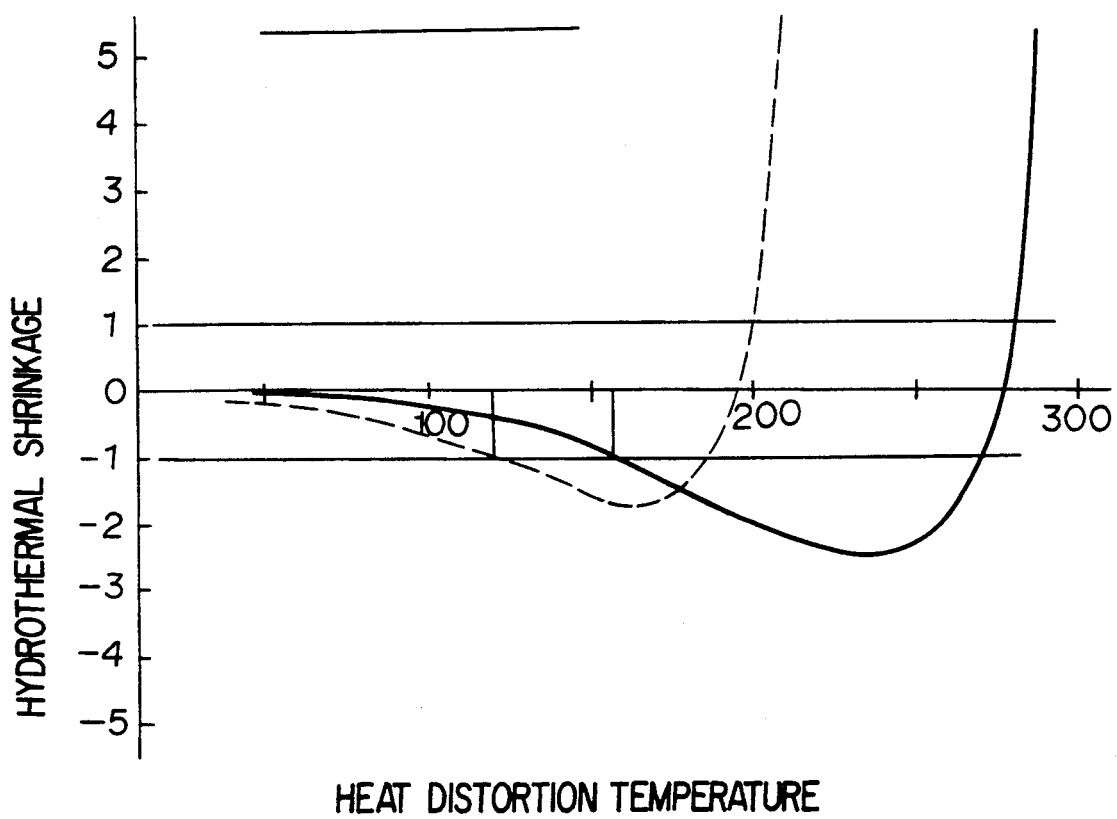

The heat resistant polyamide film of the present invention is prepared by forming a polyamide composition comprising a polyamide (A) and a semi-aromatic polyamide (B) into a film by a specific method.

Polyamide (A)

The polyamide (A) constituting the heat resistant polyamide film of the present invention, is a polyamide obtained by the polycondensation of diaminobutane and adipic acid, i.e. nylon 46.

This polyamide has a structure in which four methylene groups (—$CH_2$—) are regularly arranged between amide groups (—NHCO—). From this symmetrical structure and the high amide group concentration, the polyamide (A) has a high melting point and high crystallinity by itself.

Polyamide (B)

The semi-aromatic polyamide (B) constituting the heat resistant polyamide film of the present invention, is a polyamide containing an aliphatic diamine and an aromatic dicarboxylic acid in an amount of from 80 to 100% by weight of the polyamide-constituting components. A subsidiary polyamide-constituting component constituting from 0 to 20% by weight of the polyamide-constituting components, is a lactam and/or an aliphatic diamine and an aliphatic dicarboxylic acid. When such a lactam or the like is contained, the semi-aromatic polyamide (B) is a copolyamide.

In any case, as the aliphatic diamine, a linear aliphatic diamine having from 2 to 12 carbon atoms such as ethylene diamine, tetramethylene diamine, hexamethylene diamine or decamethylene diamine, or a lower-alkylated (e.g. a methylated or ethylated) or halogenated derivative thereof, is employed. One or more of such diamines can be employed for the polycondensation.

As the aromatic dicarboxylic acid, the one wherein the aromatic ring is a benzene ring or a naphthalene ring, or a lower-alkylated (e.g. a methylated or ethylated) or halogenated derivative thereof, preferably isophthalic acid and/or terephthalic acid, may be employed.

As the lactam, an intramolecular amide polymerizable by ring-opening polymerization, particularly the one having from 4 to 12 carbon atoms, preferably caprolactam or lauryl lactam, may be employed.

As the aliphatic dicarboxylic acid, a dicarboxylic acid having from 4 to 12 carbon atoms, such as succinic acid, glutaric acid, adipic acid, pimelic acid, suberic acid, azelaic acid or sebacic acid, or a lower-alkylated (e.g. a methylated or ethylated) or halogenated derivative thereof, may be employed. One or more of such aliphatic dicarboxylic acids may be employed for the polycondensation.

The aliphatic diamine and the aliphatic dicarboxylic acid, or the lactam used as the subsidiary polyamide-constituting component, are not particularly limited with respect to their types. However, from the viewpoint of the affinity with the polyamide (A), the aliphatic diamine is preferably tetramethylene diamine or hexamethylene diamine, the aliphatic dicarboxylic acid is preferably adipic acid, and the lactam is preferably ε-caprolactam.

Polyamide Composition

What is formed into a film by the present invention, is a polyamide composition prepared by mixing the polyamide (A) having high crystallinity and the semi-aromatic polyamide (B) which shows no substantial crystallinity. The weight ratio for mixing is (A):(B)=99.9:0.1 to 30:70. If the polyamide (A) is more than this range, fine crystals formed by (A) serve as the initiating points for rupture, whereby the biaxial stretching will be impossible. On the other hand, if the polyamide (A) is less than this range, the film after the heat setting, will not show high heat resistance since the crystal component will be small, although the biaxial stretching is possible.

Here, the limit in the weight ratio of the polyamide (A) and the polyamide (B) varies depending upon the proportions of the components constituting the polyamide (B). When the polyamide-constituting components of the aliphatic diamine and the aromatic dicarboxylic acid of the polyamide (B) are the maximum i.e. 100% by weight, the limit in the weight ratio of (A) and (B) is (A):(B) =99.9:0.1.

When the polyamide-constituting components of the aliphatic diamine and the aromatic carboxylic acid of the polyamide (B) are 80% by weight, the limit in the weight ratio of (A) and (B) is (A):(B)=30:70.

In the present invention, "a polyamide composition obtained by mixing" the polyamide (A) and the polyamide (B), means that various additives may be incorporated as the case requires in accordance with the manners commonly employed for thermoplastic resins. Accordingly, to the mixture of the polyamides (A) and (B), usual additives such as an external lubricant to stabilize the extrusion, a filler to adjust the surface roughness of the film, etc. may further be added. Of course, the formation of such a composition may be conducted during the kneading at the time of film-forming (as described in detail hereinafter).

Film-forming

The polyamide composition as described above, is melted and kneaded by an extruder, and then extruded by e.g. a T-die in the form of a sheet, which is then quenched on a casting roll to which quenching water is circulated.

This process is the same as the sheeting of a usual crystalline resin, and the heating temperature of the resin is at least the melting point and less than the decomposition temperature. The temperature of the casting roll is lower than the glass transition temperature Tg of the resin and at least the dewpoint temperature so as to avoid the condensation of moisture in the atmosphere on the roll surface. Further, it is possible and desirable to improve the quenching effect by pinning the sheet tightly to the roll surface by an electrostatic Coulomb force by providing a wire electrode in the vicinity of the contact line where the sheet is in contact with the roll surface for the first time at the upper portion of the casting roll and applying a direct current voltage between the electrode and the roll.

The polyamide sheet which is substantially amorphous without orientation, obtained by quenching, is then biaxially stretched at least 2.0×2.0 times in the longitudinal and transverse directions. If the stretching in each direction is less than 2.0 times, no adequate orientation will be imparted to the polyamide sheet, and it will be impossible to obtain a polyamide film having high heat resistance even if the temperature conditions for the subsequent heat setting are changed. Namely, to obtain a heat resistant polyamide film having a heat distortion initiation temperature of at least 130° C., stretching of at least 2.0×2.0 times in the longitudinal direction × the transverse direction, is essential in addition to the above-mentioned combination of the polyamides (A) and (B) and the blend ratio.

The biaxial stretching may be conducted by simultaneous biaxial stretching in accordance with the tenter method, successive biaxial stretching in accordance with the tenter method, or simultaneous biaxial stretching in accordance with a tubular method, or any other method. The stretching temperature is preferably as low as possible, provided it is at least the glass transition temperature Tg of the mixture of the polyamides (A) and (B). However, if the stretching temperature is close to Tg, a high tension will be exerted due to the resiliency of the sheet, and it is practically preferred that the temperature is at a level of Tg+(5° to 100° C.) to reduce the load to the stretching machinery.

After the biaxial stretching, heat setting is conducted at a temperature of at least 205° C. The heat setting is a method which comprises applying a heat while maintaining the stretching rate and exerting the tension and which is intended to help the growth of fine crystals in the film and to maintain the stretched film in the stretched state after releasing the tension. This is a quite common method for the stretching of a crystalline resin. For the combination of the polyamides (A) and (B), this heat treatment temperature is set at a temperature of at least 205° C. If the heat treatment is lower than this temperature, it will be difficult to obtain a polyamide film having high heat resistance. Namely, to obtain a heat resistant polyamide film having a heat distortion initiation temperature of at least 130° C., the heat treatment at a temperature of at least 205° C. is essential in addition to the above-mentioned combination of the polyamides (A) and (B), the blending ratio thereof and the specified stretching rate.

The upper limit of the heat treatment temperature is as high as possible, provided that it is lower than the melting point of the mixture of the polyamides (A) and (B). However, even if the temperature is lower than the melting point, partial melting is likely to be initiated. Therefore, the upper limit of the heat treatment temperature is usually at a level of Tm−(5° to 30° C.).

Polyamide Film According to the Present Invention

The polyamide film of the present invention is a film having high heat resistance, and its heat distortion initiation temperature is at least 130° C. In the present invention, the heat distortion initiation temperature is the temperature at which a distortion of ±1% takes place when a film is gradually heated in an oil bath under an elongation load in accordance with ASTM D1637-61. As mentioned above, a distortion of ±2% is specified in ASTM D1637, but the present inventors have adopted a distortion of ±1% to more severely check the quantity of the distortion and use it as an index for heat resistance. Other conditions such as the shape of the sample, the temperature raising speed, etc. are all the same as specified in ASTM D1637.

The film of the present invention has excellent heat resistance which has not been observed with commercially available polyamide films, as will be shown in the Examples given hereinafter. Therefore, the film of the present invention is useful not only as a packaging material but also as an insulating material for electric appliances rotating at a high speed, or for magnetic tapes, video tapes, flexible printed circuit boards, coating material for electric wires or filtration membranes. Thus, it is very useful.

Now, the present invention will be described in further detail with reference to Examples. However, it should be understood that the present invention is by no means restricted to such specific Examples.

EXAMPLE 1

A composition comprising 80% by weight of a nylon 46 resin ("TS400", manufactured by DSM Company, Netherlands) and 20% by weight of a semi-aromatic nylon resin "X-21", manufactured by Mitsubishi Kasei Corporation) was mixed with 0.05% by weight, based on the composition, of methylenebisamide (methylenebisstearoamide) by a V-type tumbler, and the mixture was extruded by a 40 mm extruder at a barrel temperature of 280°, 295° or 305° C. and a T-die at a die temperature of 305° C. in the form of a sheet, which was then wound up while being quenched by a casting roll to which quenching water of 25° C. was circulated. At that time, a tungsten wire having a diameter of 0.1 mm was extended at a position 10 mm above the position (the contact line) at which the molten resin was in contact with the casting roll, and a voltage of 12 Kv was applied between the roll and the wire with the wire side being negative, to effect close contact by an electrostatic Coulomb force.

The sheet peeled off from the casting roll was transparent and had a thickness of about 100 μm.

This substantially non-stretched sheet was stretched 2.5×2.5 times in both the longitudinal (MD) and transverse (TD) directions at 150° C. by a tenter method, then heat-set at 270° C. for 20 seconds, and wound up to obtain a film having a thickness of 15 μm.

The hydrothermal shrinkage and the heat distortion initiation temperature of this film as measured in an oil bath, are as shown in Table 1.

The semi-aromatic nylon resin used was a semi-aromatic polyamide comprising 90% by weight of a copolymer polyamide component comprising hexamethylene diamine, isophthalic acid (IP acid) and terephthalic acid (TP acid) (weight ratio of IP acid:TP acid=2:1) and 10% by weight of a copolymer polyamide component comprising hexamethylene diamine and adipic acid.

EXAMPLE 2

A film was prepared in the same manner as in Example 1 except that 90% by weight of the nylon 46 resin and 10% by weight of the semi-aromatic nylon resin were mixed. The hydrothermal shrinkage and the heat distortion initiation temperature of this film are shown in Table 1.

EXAMPLE 3

A film was prepared in the same manner as in Example 1 except that 95% by weight of the nylon 46 resin and 5% by weight of the semi-aromatic nylon resin were mixed. The hydrothermal shrinkage and the heat distortion initiation temperature of this film are shown in Table 1.

COMPARATIVE EXAMPLE 1

Biaxial stretching was conducted in the same manner as in Example 1 except that 100% by weight of the nylon 46 resin was used.

In Comparative Example 1, the rupture of sheets was substantial, and biaxial stretching was not possible. In other Examples, biaxially stretched films were obtained, and the hydrothermal shrinkages and the heat distortion initiation temperatures of the films were measured. The results are shown in Table 1.

TABLE 1

|  | Polyamide composition | Film-forming conditions | | Biaxial stretching | Hydrothermal shrinkage | | Heat distortion initiation temp. |
|---|---|---|---|---|---|---|---|
|  |  | Stretching rate | Heat setting temp. |  | 95° C. | 127° C. |  |
| Example 1 | (A):(B) = 80:20 | MD × TD 2.5 × 2.5 | 270° C. | Possible | 0 | 1-2% | 156° C. |
| Example 2 | (A):(B) = 90:10 | 2.5 × 2.5 | 270° C. | Possible | 0 | 1-2% | 159° C. |
| Example 3 | (A):(B) = 95:5 | 2.5 × 2.5 | 270° C. | Possible | 0 | 0-1% | 162° C. |
| Comparative Example 1 | (A):(B) = 100:0 | 2.5 × 2.5 | — | Impossible | — | — | — |
| Comparative Example 2 | (A):(B) = 20:80 | 2.5 × 2.5 | 270° C. | Possible | 5-8% | 15-23% | 103° C. |
| Example 4 | (A):(B) = 80:20 | 2.0 × 2.0 | 270° C. | Possible | 0 | 2-3% | 152° C. |
| Example 5 | (A):(B) = 80:20 | 3.0 × 3.0 | 270° C. | Possible | 0 | 0-1% | 160° C. |
| Example 6 | (A):(B) = 80:20 | 2.0 × 2.0 | 230° C. | Possible | 0-1% | 3-5% | 145° C. |
| Comparative Example 3 | (A):(B) = 80:20 | 2.0 × 2.0 | 180° C. | Possible | 2-4% | 8-12% | 115° C. |
| Comparative Example 4 | Poly-ε-caproamide | 3.2 × 3.2 | 195° C. | Possible | 5-8% | 15-23% | 120° C. |

COMPARATIVE EXAMPLE 2

A film was prepared in the same manner as in Example 1 except that 20% by weight of the nylon 46 resin and 80% by weight of the semi-aromatic nylon resin were used.

EXAMPLE 4

A film was prepared in the same manner as in Example 1 except that the stretching rate was changed to 2.0×2.0 times.

EXAMPLE 5

A film was prepared in the same manner as in Example 1 except that the stretching rate was changed to 3.0×3.0 times.

EXAMPLE 6

A film was prepared in the same manner as in Example 1 except that the stretching rate was changed to 2.0×2.0 times and the heat setting temperature was changed to 230° C.

COMPARATIVE EXAMPLE 3

A film was prepared in the same manner as in Example 1 except that the stretching rate was changed to 2.0×2.0 times and the heat setting temperature was changed to 180° C.

COMPARATIVE EXAMPLE 4

Nylon 6 resin ("Novamid 1022CMK" manufactured by Mitsubishi Kasei Corporation) was extruded by a 40 mm extruder at a barrel temperature of 190°, 220° or 240° C. and a T-die having a die temperature of 240° C., in the form of a sheet, which was wound up under quenching on a casting roll to which quenching water of 25° C. was circulated. Then, in the same manner as in Example 1, the film was closely in contact with the casting roll by the electrostatic Coulomb force. The sheet peeled off from the casting roll, was transparent and had a thickness of about 150 μm. This substantially non-stretched sheet was stretched 3.2×3.2 times in the longitudinal and transverse direction at 70° C. by a tenter method, then heat-set at 195° C. for 20 seconds and wound up to obtain a film having a thickness of 15 μm.

From the comparison of the results of the Examples and the results of the Comparative Examples, it is apparent that the polyamide films according to the present invention have high heat resistance which can not be attained by any commercially available polyamide films.

We claim:

1. A heat resistant polyamide film which is obtained by melt-extruding into a sheet a polyamide composition comprising a mixture of a preformed polyamide (A) composed of diaminobutane and adipic acid and a preformed semi-aromatic polyamide (B) having no substantial crystallinity composed of a polyamide containing an aromatic dicarboxylic acid and an aliphatic diamine in an amount of at least 80% by weight of the polyamide-constituting components, in a weight ratio of (A):(B)=99.9:0.1 to 30:70, quenching the sheet, then biaxially stretching it at least 2.0×2.0 times, followed by heat setting at a temperature of at least 205° C., and which has a heat distortion initiation temperature of at least 130° C.

2. The polyamide film according to claim 1, wherein the polyamide (A) is nylon 46.

3. The polyamide film according to claim 1, wherein the aliphatic diamine is a linear aliphatic diamine having from 2 to 12 carbon atoms, or a lower-alkylated or halogenated derivative thereof.

4. The polyamide film according to claim 1, wherein the aromatic dicarboxylic acid is the one wherein the aromatic ring is a benzene ring or a naphthalene ring, or a lower-alkylated or halogenated derivative of said aromatic ring.

5. The polyamide film according to claim 1, wherein the aromatic dicarboxylic acid is isophthalic acid and/or terephthalic acid.

6. The polyamide film according to claim 1, wherein the semi-aromatic polyamide contains up to 20% by weight of polyamide-constituting component consisting of a lactam, or an aliphatic diamine and/or an aliphatic dicarboxylic acid.

7. The polyamide film according to claim 6, wherein the lactam is ε-caprolactam, the aliphatic diamine is tetramethylene diamine or hexamethylene diamine, and the aliphatic dicarboxylic acid is adipic acid.

* * * * *